INVENTOR
JOSEPH W. ALLEN

Patented Sept. 29, 1936

2,055,645

UNITED STATES PATENT OFFICE 2,055,645

STORAGE BATTERY

Joseph W. Allen, East Orange, N. J.

Application January 9, 1932, Serial No. 585,787

2 Claims. (Cl. 136—162)

This invention relates to a device for replenishing and indicating the electrolyte content of a storage battery and is intended for use with any storage battery, requiring the addition of distilled water, in which the various joints between cell covers, posts, and vent plugs are provided with liquid tight seals.

The objects of the invention are, first, to maintain the proper amount of electrolyte in the battery; second, to provide for the visual indication of the need for additional liquid or electrolyte; third, to provide a rapid and ready means for automatically replenishing the electrolyte content of the battery; fourth, to prevent the battery plates from becoming exposed to the air with resultant harmful sulphation; and fifth, to provide a reservoir for accommodating the overflow from the battery of excess electrolyte due to the heating of the electrolyte or the formation of gas bubbles therein.

Figure 1:
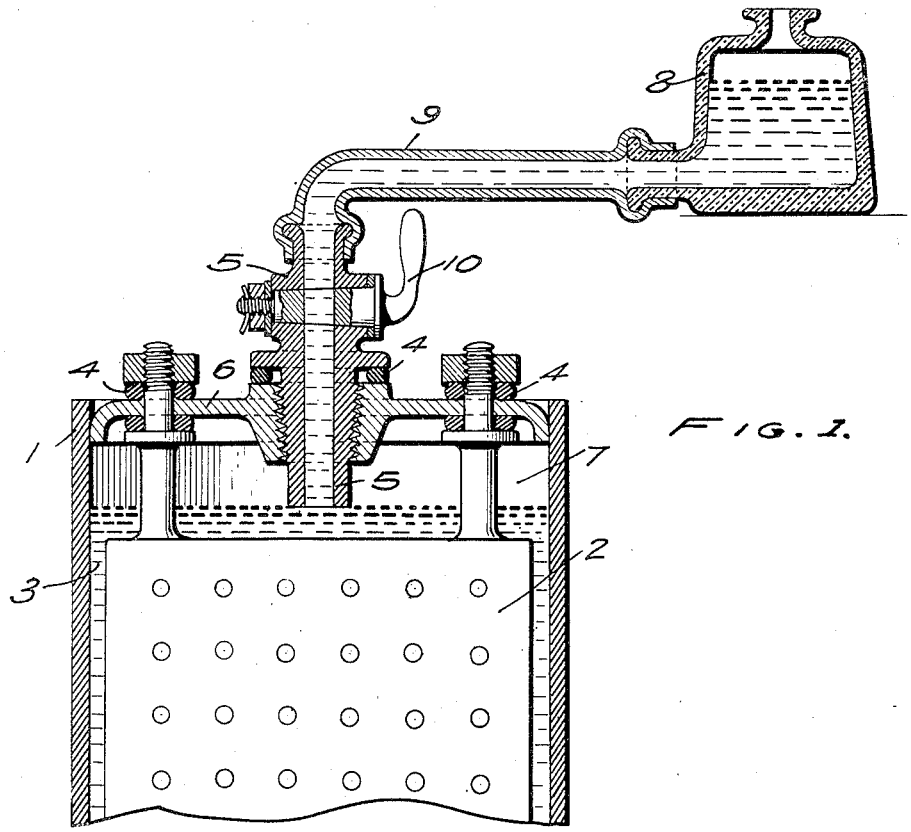
Figure 2:
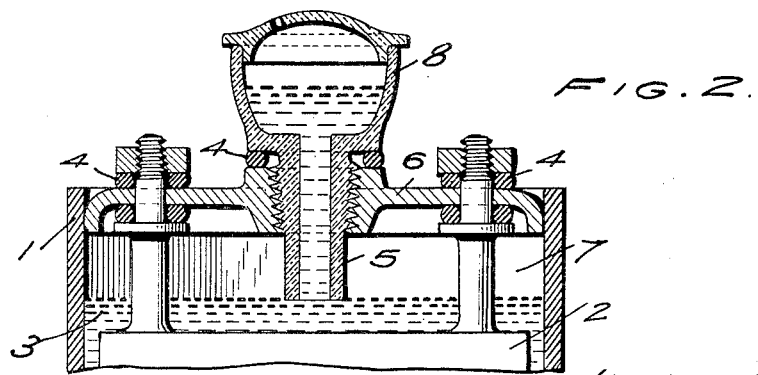

Additional objects and advantages of the invention will be apparent from the following description and the accompanying drawing, wherein:

Figure 1 is a cross section of a typical storage battery embodying the invention, and Figure 2 is a fragmentary sectional view of a modification of the invention.

The drawing shows the construction of a typical storage battery which embodies the containing jar 1, the battery plates 2, the liquid or electrolyte content 3, sealing means 4, and vent plug 5. The level of the electrolyte is normally intended to be such as to completely cover the battery plates 2 and yet be sufficiently below the battery cover 6 to provide an air space 7 above the electrolyte.

The vent plug 5 is so designed that, when in place on the battery, the bottom of the plug is at, or slightly above, the normal electrolyte level and a reservoir 8 containing electrolyte or distilled water is connected with the vent plug and is so located that its contents tend to flow through the vent plug into the air space 7 of the battery. In the form shown in Fig. 1, the reservoir is remote from the vent plug and connected with the latter by a length of tubing 9. In the modification disclosed in Fig. 2, the reservoir is formed integral with the vent plug and is of smaller capacity than the reservoir shown in Fig. 1.

When the liquid in the storage battery is above the bottom opening of the vent plug, a pressure is produced in the air space 7 which prevents any further flow of liquid from the reservoir into the battery jar 1. Any normal evaporation will take place only at the surface of the liquid in the reservoir 8. The liquid in the reservoir can be replenished when necessary and in order that the time of replenishment may be readily determined the reservoir is made of transparent material. As shown in Fig. 1 the vent plug can be provided with a stop-cock 10 to cut off any flow of liquid from the reservoir to the battery to prevent loss of electrolyte from the reservoir while installing or removing the device.

The reservoir is advantageous, also, in accommodating excess electrolyte from the battery resulting from the heating of the electrolyte or the formation of gas bubbles. During "gassing" of a battery, the electrolyte is disassociated into its component gases which collect in the air space 7 and develop a pressure. This pressure acts to force the liquid of the container up through vent plug 5 and into the reservoir 8. With sufficient pressure, the liquid level of the battery is forced down to the bottom opening of the vent plug whereupon the excess compressed gases escape up through the vent plug and reservoir and pass off into the atmosphere. With the excess pressure relieved, the liquid from the reservoir descends into the battery and raises the level of the electrolyte.

The passageway through the vent plug and connecting tube 9, is of such size as to permit the liquid to pass down into the battery while the gases are passing upwardly therefrom so that with continuous "gassing" there would be no possibility of the electrolyte level falling below the top of the battery plates. Thus, with this device, as the apparent electrolyte volume increases when charging a battery, the excess goes into the reservoir instead of spilling over onto the top of the battery and after charge, as the electrolyte cools off and the gas bubbles escape, the electrolyte level is maintained by addition from the reservoir.

With stationary storage batteries, as for example radio "A" batteries, this device can be left in place at all times and the need for additional liquid perceived at any time by reason of the transparency of the reservoir. This permits of locating the battery on a shelf without necessitating excessive head space for determining the amount of electrolyte in a battery, as is required when looking into the battery through the vent plug opening.

Having thus described the invention, what is claimed is:

1. In an automatic storage battery refilling device of the type in which each cell is provided with separate and similar replenishing means, the combination with a storage battery cell having a filling orifice of replenishing means therefor comprising a transparent liquid-holding vessel vented to admit atmospheric pressure on the surface of the liquid therein and having a tubular passage-forming extension depending therefrom and tightly fitting the filling orifice of the cell to provide a liquid-filled connecting passage between the vented vessel and the interior of the cell by way of which the liquid in the vessel enters the cell and excess gases and electrolyte in the cell pass to the vented vessel, the said cell being sealed against the passage of gases and liquid to and from the interior thereof except by way of the opening at the cell-enclosed terminal end of the passage and the said passage extending into the cell substantially to the normal electrolyte level and being dimensioned to permit the gases entering the open terminal end of the passage to freely pass by and to be replaced with the liquid standing in said passage.

2. In an automatic storage battery refilling device of the type in which each cell is provided with separate and similar replenishing means, the combination of a cell having a filling orifice; a transparent substantially closed liquid-holding vessel vented to admit atmospheric pressure on the surface of the liquid therein and having a liquid-outlet orifice, said vessel being externally of the battery and remotely located with respect to said cell; a removable tubular plug tightly fitting the filling orifice of the cell and extending inwardly and outwardly of the cell with the inner open end of the bore of the plug substantially at the normal electrolyte level; and a length of flexible tubing connecting the liquid-outlet orifice of the vessel with the outer open end of the plug bore and providing jointly with said plug a liquid-filled connecting conduit between the liquid-holding vessel and the interior of the cell by way of which the liquid of the vessel passes downwardly into the cell and the excess gases and electrolyte of the cell pass upwardly into the vented vessel, the said cell being sealed against the passage of gases and liquid from and to the interior thereof except by way of the inner open end of the conduit and the said conduit being dimensioned to permit the gases entering the said inner open end thereof to pass by and to be automatically replaced with the liquid standing in the conduit.

JOSEPH W. ALLEN.